(12) United States Patent
Issaeva et al.

(10) Patent No.: US 10,582,558 B2
(45) Date of Patent: *Mar. 3, 2020

(54) METHOD FOR FAST CIRCUIT SWITCHED SERVICE ENABLING HANDOVER FROM PACKET-SWITCHED ONLY NETWORKS

(71) Applicant: NOKIA TECHNOLOGIES OY, Espoo (FI)

(72) Inventors: Tatiana Issaeva, Espoo (FI); Miikka Huomo, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,418

(22) Filed: Jun. 12, 2017

(65) Prior Publication Data

US 2017/0280497 A1 Sep. 28, 2017

Related U.S. Application Data

(63) Continuation of application No. 12/522,278, filed as application No. PCT/IB2007/003918 on Dec. 14, 2007, now Pat. No. 9,699,824.

(60) Provisional application No. 60/879,045, filed on Jan. 8, 2007.

(51) Int. Cl.
*H04W 76/22* (2018.01)
*H04W 36/14* (2009.01)

(52) U.S. Cl.
CPC ............ *H04W 76/22* (2018.02); *H04W 36/14* (2013.01)

(58) Field of Classification Search
CPC ......... H04W 76/041; H04W 29/06027; H04M 7/006
See application file for complete search history.

(56) References Cited

U.S. PATENT DOCUMENTS

| | | | |
|---|---|---|---|
| 7,522,585 B2 | 4/2009 | Liu et al. | |
| 9,699,824 B2* | 7/2017 | Issaeva | H04W 76/041 |
| 2002/0085516 A1* | 7/2002 | Bridgelall | H04W 36/04 370/329 |
| 2002/0151304 A1 | 10/2002 | Hogan | |
| 2003/0039237 A1* | 2/2003 | Forslow | H04W 28/18 370/352 |
| 2003/0169725 A1* | 9/2003 | Ahmavaara | H04W 36/0022 370/352 |
| 2004/0001474 A1 | 1/2004 | Simelius et al. | |

(Continued)

FOREIGN PATENT DOCUMENTS

FR  2865599 A  7/2005

OTHER PUBLICATIONS

"Published International Application and International Search Report of the International Searching Authority", received in corresponding PCT Application No. PCT/IB2007/003918, dated May 30, 2008, 41 pages.

*Primary Examiner* — Jael M Ulysse
(74) *Attorney, Agent, or Firm* — Squire Patton Boggs (US) LLP (57) ABSTRACT

Quick and efficient handover of a user equipment (UE) from a Wideband Code-Division Multiple Access (WCDMA) packet switched only network to a Circuit Switched enabled (CSe) network is provided by certain embodiments. Parallelization of the Radio Access Network (RAN) processes and the User Equipment (UE) processes can help to reduce delay in such handovers.

9 Claims, 10 Drawing Sheets

(56) References Cited

U.S. PATENT DOCUMENTS

| | | | |
|---|---|---|---|
| 2004/0029614 A1* | 2/2004 | Back | H04W 36/12 455/560 |
| 2004/0100913 A1 | 5/2004 | Kalliokulju et al. | |
| 2004/0137876 A1* | 7/2004 | Fischer | H04L 63/123 455/410 |
| 2004/0147242 A1* | 7/2004 | Pasanen | H04W 8/22 455/403 |
| 2004/0156329 A1* | 8/2004 | Bck | H04W 36/0066 370/328 |
| 2004/0258019 A1* | 12/2004 | Haumont | H04W 8/12 370/331 |
| 2005/0021586 A1* | 1/2005 | Bichot | H04W 48/18 709/200 |
| 2005/0030928 A1 | 2/2005 | Virtanen et al. | |
| 2005/0030958 A1* | 2/2005 | Laiho | H04W 36/12 370/401 |
| 2005/0163106 A1* | 7/2005 | Vaittinen | H04W 76/064 370/352 |
| 2005/0169207 A1 | 8/2005 | Muniere | |
| 2005/0207396 A1* | 9/2005 | Vaittinen | H04W 74/02 370/352 |
| 2005/0243870 A1 | 11/2005 | Balogh et al. | |
| 2005/0245263 A1 | 11/2005 | Ejzak | |
| 2006/0035645 A1* | 2/2006 | Kim | H04W 36/0007 455/452.1 |
| 2006/0083199 A1* | 4/2006 | Yang | H04L 29/06027 370/331 |
| 2006/0089137 A1 | 4/2006 | Howell et al. | |
| 2006/0109819 A1* | 5/2006 | Marin | H04L 12/18 370/331 |
| 2006/0209798 A1* | 9/2006 | Oikarinen | H04L 41/06 370/352 |
| 2006/0218291 A1 | 9/2006 | Zhu et al. | |
| 2006/0246906 A1* | 11/2006 | Vaittinen | H04W 36/14 455/442 |
| 2006/0268848 A1* | 11/2006 | Larsson | H04L 29/06027 370/356 |
| 2007/0005803 A1* | 1/2007 | Saifullah | H04W 36/0022 709/245 |
| 2007/0014281 A1* | 1/2007 | Kant | H04L 29/06027 370/352 |
| 2007/0081497 A1* | 4/2007 | Drevon | H04W 36/26 370/331 |
| 2007/0121608 A1 | 5/2007 | Gu et al. | |
| 2007/0165574 A1* | 7/2007 | Srey | H04W 36/02 370/331 |
| 2007/0218911 A1* | 9/2007 | Islam | H04W 60/04 455/445 |
| 2008/0026752 A1 | 1/2008 | Flore et al. | |
| 2008/0026755 A1* | 1/2008 | Venkataraman | H04W 36/28 455/436 |
| 2008/0037515 A1* | 2/2008 | Sander | H04W 68/00 370/352 |
| 2008/0080480 A1* | 4/2008 | Buckley | H04L 12/66 370/352 |
| 2008/0112353 A1 | 5/2008 | Ljung et al. | |
| 2010/0260099 A1 | 10/2010 | Frost et al. | |

* cited by examiner

METHOD FOR FAST CIRCUIT SWITCHED SERVICE ENABLING HANDOVER FROM PACKET-SWITCHED ONLY NETWORKS

RELATED APPLICATION

This application is a continuation application of U.S. patent application Ser. No. 12/522,278, filed on Nov. 19, 2009 which was originally filed as PCT Application No. PCT/IB2007/003918, filed Dec. 14, 2007, which claims the priority of U.S. Provisional Application No. 60/879,045, filed Jan. 8, 2007. The disclosures of the prior applications are hereby incorporated by reference in their entirety.

BACKGROUND OF THE INVENTION

Field of the Invention

Certain embodiments of the present invention relate to Internet High Speed Packet Access (I-HSPA) and handovers associated therewith. More particularly, certain embodiments of the invention relate to fast handover from a packet-switched only network to a circuit-switched enabled network.

Description of the Related Art

Recently, apparatuses and architectures have been presented to enable circuit switched (CS) functionality for a packet switched (PS) only network. With the recent development of such technologies as High Speed Downlink Packet Access (HSDPA) and High Speed Uplink Packet Access (HSUPA) there can exist a need for network architectures optimized for fast and efficient packet transfer. Internet High Speed Packet Access (I-HSPA) is one example of such network architecture, and is cost-efficient packet switched-only Wideband Code-Division Multiple Access (WCDMA) network.

SUMMARY

According to certain embodiments, a method can include initiating, responsive to receiving a request for a circuit switched connection, establishment of the circuit switched connection. The circuit switched connection regards a user equipment that is associated with a packet switched only network. The request comprises a plurality of parameters relating to the establishment of the circuit switched connection. The method also includes transferring information regarding the initiating of the establishment of the circuit switched connection from the packet switched only network to a circuit switched enabled network.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

In I-HSPA, radio access architecture the Radio Network Controller (RNC) functions can be moved to an I-HSPA NodeB. The I-HSPA system can use Third Generation Partnership Project (3GPP) Release 5 and Release 6 air interface without modifications.

Figure 1:
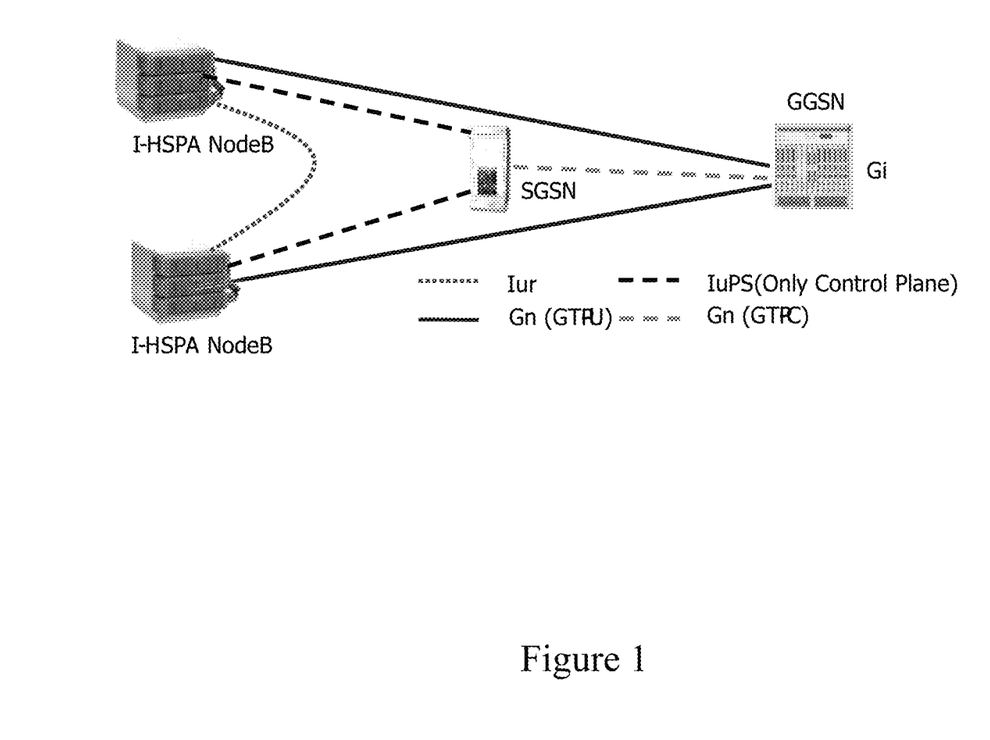
FIG. 1 illustrates an Internet High Speed Packet Access architecture (I-HSPA).

FIG. 1 illustrates an example architecture of I-HSPA.

An I-HSPA NodeB can include two elements: a WCDMA NodeB and an I-HSPA Adapter. Below, when a NodeB is mentioned, it is generally the WCDMA NodeB, unless indicated otherwise.

The logical interface between the NodeB and the adapter can be a NodeB internal Iub with no or minimal modification due to I-HSPA. The I-HSPA Adapter functionality is, essentially, a minimized packet switched-only RNC with a conventional Iub interface to the Node B and an Iu-packet switched control plane interface to a packet switched core network.

Nevertheless, circuit switched services can be an important source of revenues for cellular operators and, thus, fast and reliable methods to provide redirection or hand-offs of mobile units or other user equipments from packet switched-only networks to networks that provide circuit switched services may be desirable. Such types of redirections are sometimes referred to below as circuit switched service enabling handovers.

An apparatus and architecture have been presented to show how circuit-switched service enabling handovers can be done by extending a packet switched network with circuit switched enabling functionality. However, certain improvements may be desirable especially in terms of speed of handover.

Certain embodiments of the present invention provide a method for fast circuit switched service enabling handover from packet switched-only WCDMA/HSPA networks. Thus, certain embodiments of the present invention can address shortcomings of previous inventions and can provide extension to existing circuit switched networks. Thus, certain embodiments of the present invention can allow faster and more reliable circuit switched service enabling handovers.

More particularly, certain embodiments of the present invention deal with how to efficiently handoff a user equipment (UE) from a WCDMA packet switched only network, when the user equipment requests circuit switched service setup (for example circuit switched call) to a circuit switched service WCDMA network. Methods that can be defined with existing 3GPP signaling and architecture for redirecting user equipment from a packet switched-only network to a WCDMA network with circuit switched service when the user equipment request circuit switched service can experience long delays in the circuit switched call setup. This delay can be caused by the fact that either user equipment is requested to make a cell reselection or then Initial Direct Transfer (IDT) Protocol Data Unit (PDU), which carries circuit switched service initiating Non Access Stratum (NAS) PDU, is lost in packet switched-only RNC.

Certain embodiments of the present invention describe a method to provide fast and reliable circuit switched service enabling handovers, which can preserve the circuit switched service initiating NAS PDU and transfer it to the circuit switched service supporting Radio Network Controller (RNC) in a circuit switched network. The circuit switched service supporting network can then proceed with circuit switched call setup. Also, the circuit switched network RNC functionality can be extended to allow it to process circuit switched service setup in such a situation. Such a method can considerably improve delays for circuit switched call setup in such situations.

The methods for circuit switched service enabling handovers, which are specified by utilizing existing 3GPP specified signaling and previously existing apparatuses could be made more reliable and efficient by reducing delays in setting up circuit switched voice call, which can last from three seconds to about five seconds. Such delays may be considered too long by cellular network operators. In certain radio conditions or with certain terminal implementations delays can be even longer.

Figure 2:
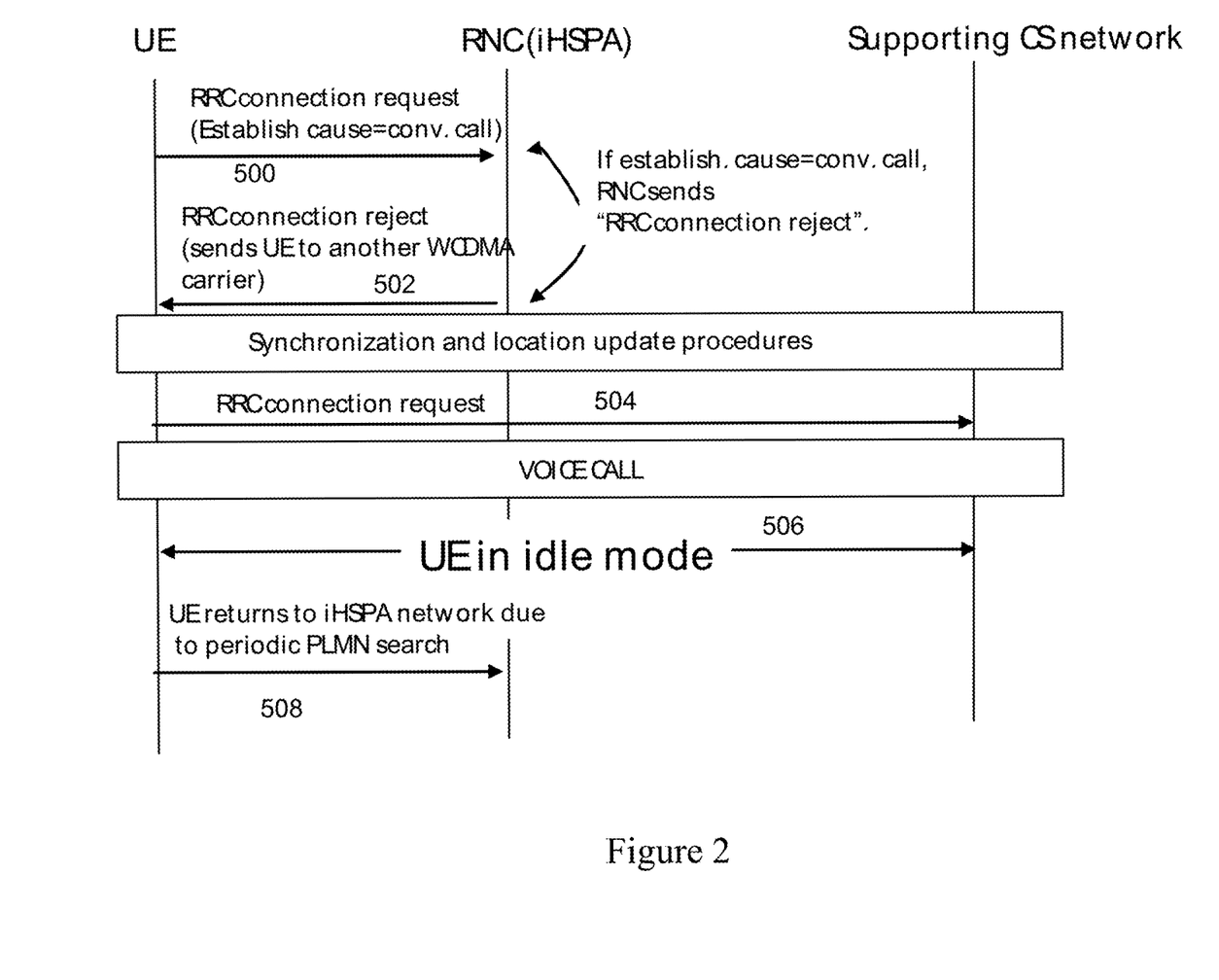
FIG. 2 illustrates a circuit switched service enabling handover by Radio Resource Control (RRC) connection rejection method.

In some cases, when a user equipment does not have RRC connection with a packet switched-only WCDMA network (for example, in I-HSPA) and the user equipment requests a circuit switched voice call, the user equipment can be redirected to another WCDMA carrier, using any of the following three methods (method 1, method 2, and method 3), which do not employ an extension of the circuit switched network:

Method 1 is illustrated in FIG. 2. As illustrated in FIG. 2, a user equipment can be redirected to another WCDMA carrier, which supports circuit switched services upon an RRC connection request from the user equipment when it is established that the cause for the connection request is in order to conduct a conversational call.

This method may not inevitably identify whether or not circuit switched service was requested, because having the establishment cause set to "conversational call" alone may not be enough to decide that the call is to be circuit switched. For example, terminals may use this cause for Voice over Internet Protocol (VoIP) calls. In Release 6, the 3GPP specifications addressed this issue, and an RRC connection request also contains a domain indicator (circuit switched or packet switched), although such an indicator was not part of Release 5, and, thus, may not be available to address Release 5 terminals.

Figure 3:
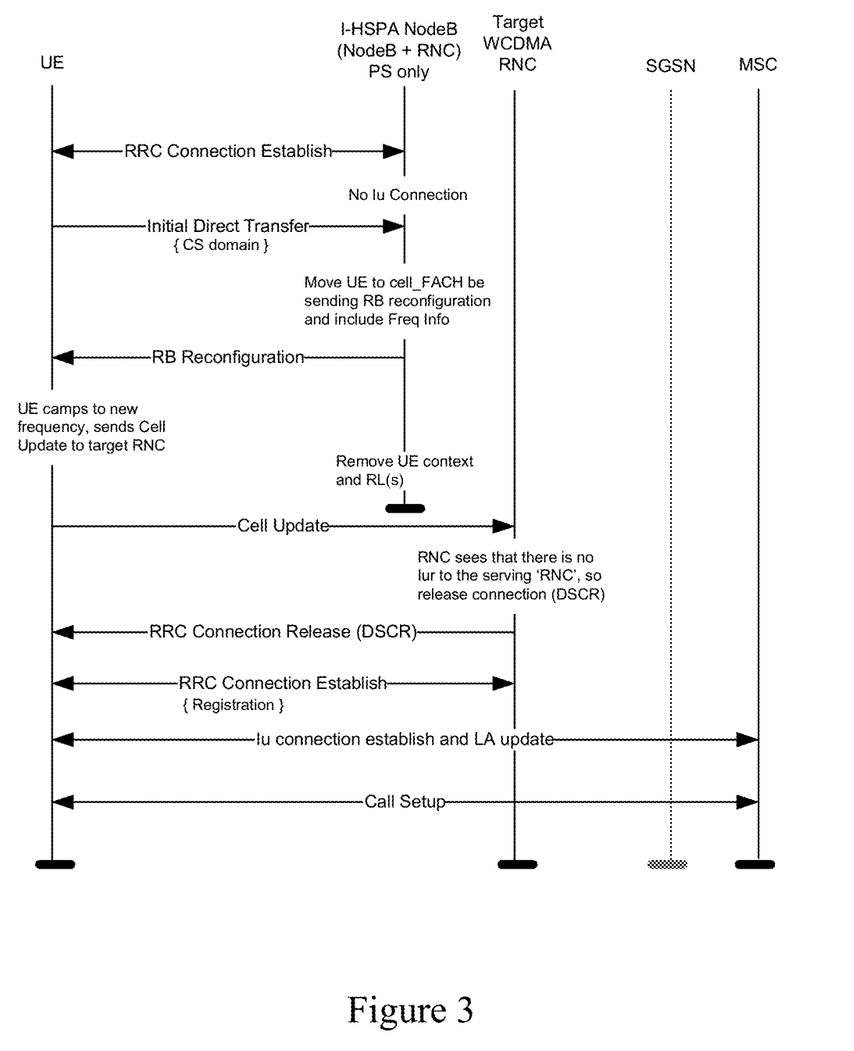
FIG. 3 illustrates a circuit switched service enabling handover by RB reconfiguration method.

Method 2 can be a circuit switched enabling handover by Radio Bearer (RB) reconfiguration. In method 2, as illustrated in FIG. 3, user equipment can be redirected to another WCDMA carrier, which supports circuit switched services, by executing a Radio Bearer Reconfiguration procedure upon reception of an Initial Direct Transfer PDU with a domain indicator set for circuit switched domain.

Method 2 can be reliable when identifying whether or not circuit switched service was requested by user equipment, as it uses a domain indicator in an Initial Direct Transfer PDU to identify that circuit switched service is requested, and it can address Release 5 terminals discussed above. However, delay for circuit switched voice call setup with this method can be around 5-6 seconds or longer. Such long delays can be caused by the need to execute a Cell Update procedure and repeat a new RRC Connection Setup.

Also, the Initial Direct Transfer PDU with NAS message for initiating circuit switched service connection setup can be lost, and it is expected to be re-transmitted by NAS protocol layers, which can create further delays and unexpected protocol failures.

When a user equipment has an active RRC connection with a packet switched-only WCDMA network and the user equipment requests circuit switched voice call, it can also be redirected to another WCDMA carrier as presented in method 3 below. Scenarios in which the user equipment requests circuit switched service while having active RRC connection with a packet switched only network can happen frequently. In such a scenario, the user equipment can have an active packet switched connection (active data transfer) or the user equipment can be kept in an RRC connected states such as Cell_FACH, Cell-PCH or URA_PCH while not necessarily having any active data transfer.

Figure 4:
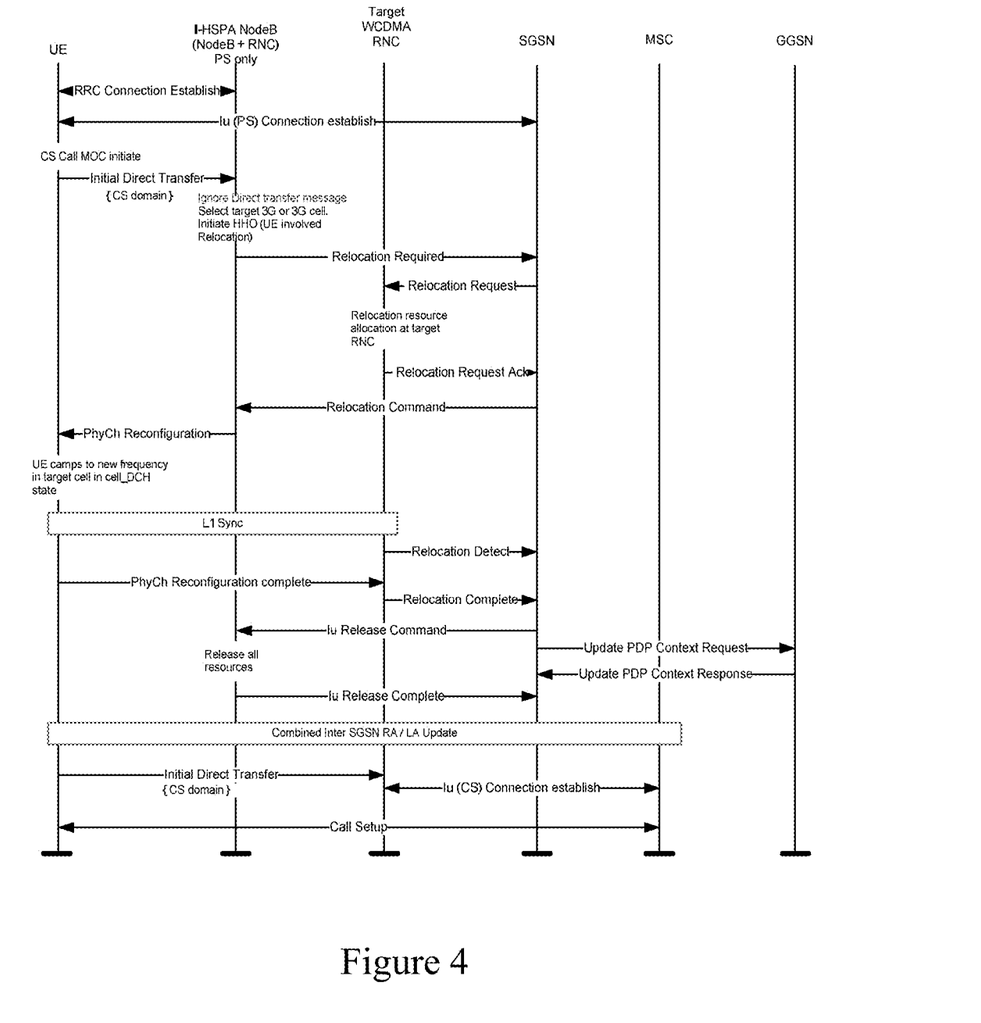
FIG. 4 illustrates a method for circuit switched service enabling handover for user equipments with existent RRC connections.

Method 3 can be a method for circuit switched enabling handover for user equipments with existing Radio Resource Control (RRC) connection. Method 3 is illustrated in FIG. 4. As illustrated in FIG. 4, a user equipment with an existing RRC connection and possibly also an active packet switched data transfer can be redirected (relocated) to another WCDMA carrier, which supports circuit switched services, by executing a Hard Handover with a SRNC Relocation to an overlaying WCDMA circuit switched and packet switched network. The trigger for initiation of the SRNC Relocation procedure can be reception of an Initial Direct Transfer PDU with the domain indicator set for a circuit switched domain.

In method 3, delays for circuit switched call setup can be similar to those for method 2. This is caused by the fact that the Initial Direct Transfer PDU with NAS message for initiating circuit switched voice call setup will be lost and it is expected to be re-transmitted by the NAS protocol layers on a new carrier after completion of the hard handover. This retransmission can cause further delays and unexpected protocol failures.

As can be seen above, while methods 2 and 3 for redirecting user equipments that request circuit switched service out of packet switched only networks can be implemented, they can produce delay in the setup of circuit switched voice calls. Such delays may be unacceptable to some cellular operators.

Certain embodiments of the present invention can employ extensions to existing RRC protocol messages, which are exchanged between RNCs in respect to Serving Radio Network Subsystem (SRNC) relocation. The extensions, however, can be implemented transparently to the Iu and Uu interfaces. The SGSN functionality, thus, can remain unimpacted, and the RNC functionality can be extended.

Figure 5:
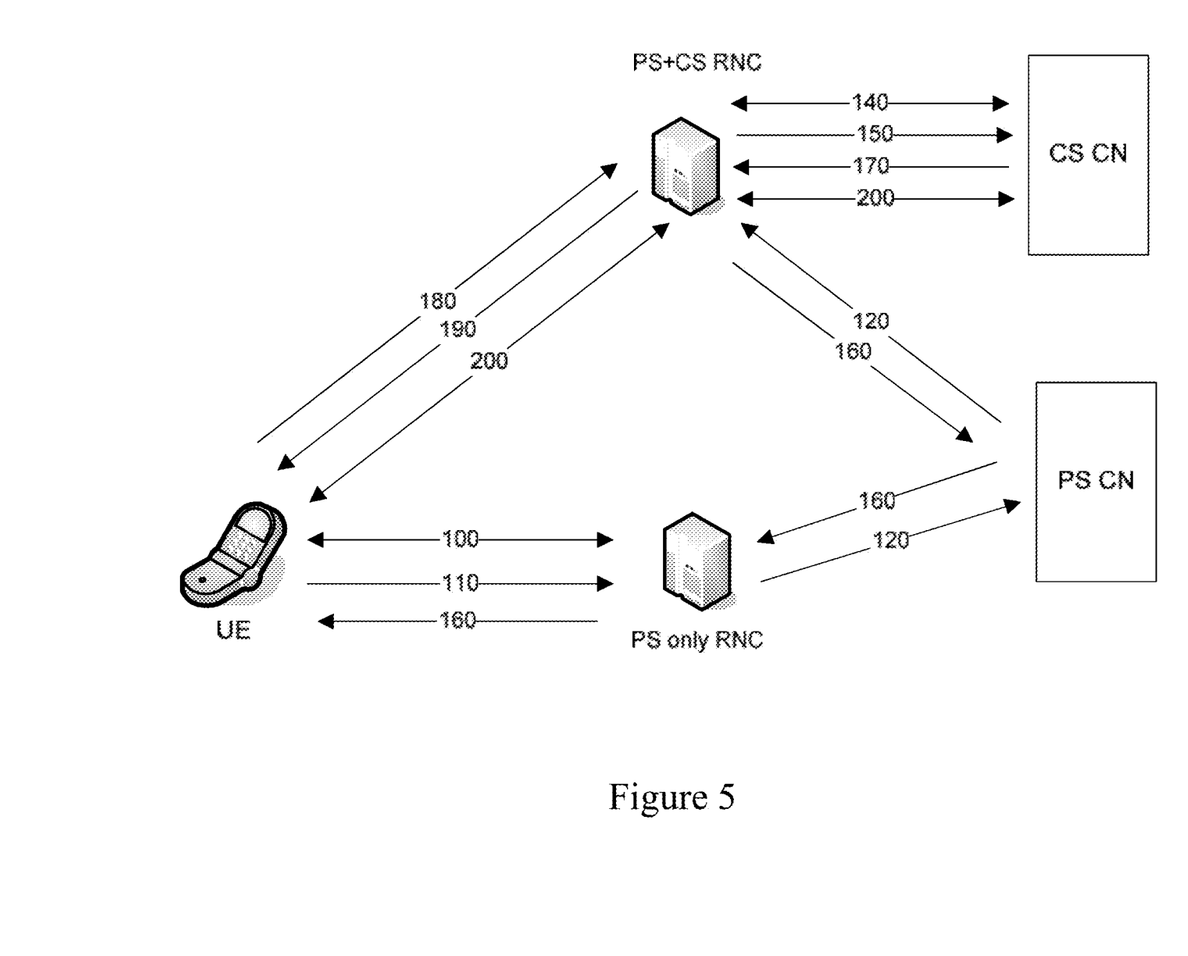
FIG. 5 illustrates a main embodiment of a method and system of the present invention for fast circuit switched service enabling handovers.

FIG. 5 illustrates a main embodiment of the present invention. As shown in FIG. 5, before the user equipment can request any type of connection from a radio access network it can first set up an RRC connection with the radio access network (RAN) (step 100). Then the user equipment can send a circuit switched service request to the RNC (step 110). In a WCDMA/HSPA network, for example, this can be an Initial Direct Transfer PDU, from which packet switched-only RNC will be able to identify that circuit switched service is requested.

In such a case, a packet switched-only RNC can transfer the circuit switched service request and the user equipment control to a circuit switched and packet switched RNC (step 120). When packet switched and circuit switched RNC receives the request to take the user equipment control together with the circuit switched service request it can set up a connection to a circuit switched core network node (140), initiate a circuit switched service setup, and forward the circuit switched service request to the circuit switched core network node (step 150).

The circuit switched and packet switched RNC can also proceed with taking the user equipment under its control and command the user equipment to move to a cell under control of a circuit switched and packet switched RNC (step 160). During the time after step 150 and before step 180 is completed, circuit switched and packet switched RNC can buffer any possible circuit switched service setup related messages from circuit switched core network node (step 170) until the user equipment confirms that it has moved to new cell (step 180). Also the circuit switched and packet switched RNC can delay execution of any procedure related to circuit switched call setup, which may either be requested by the circuit switched core network node or be required by internal processing logic of the RNC until completion of step 180.

After the user equipment confirms that it has moved to a cell under control of the circuit switched and packet switched RNC (step 180), the circuit switched and packet switched RNC can forward the messages, buffered in step 170, to user equipment (step 190). After that, the circuit switched and packet switched RNC and the user equipment can proceed with circuit switched service setup and circuit switched service as normal (step 200). If execution of any procedure related to the circuit switched call setup has been delayed as described above, then execution of this procedure can be assumed to occur in step 200.

Certain embodiments of the present invention can address the cases both of mobile originated circuit switched calls and mobile terminated circuit switched calls, as both types of calls can start with setting up a Radio Resource Control (RRC) connection (step 100). In the case of a mobile originated circuit switched call, step 100 can be done upon user request, and in the case of a mobile terminated circuit switched call, step 100 can be executed in response to paging. The user equipment can be configured to respond to the paging, for example, according to predefined rules. Thus, even in the case of a mobile terminated circuit switched call, the user equipment can decide whether to request circuit switched service from the packet switched only network.

An example of how this general way in which this can be implemented with existing 3GPP signaling procedures with no impact on the Iu and Uu interfaces is presented below as a first embodiment of the present invention, implementation option 1. Some other alternative implementation options are presented too (implementation option 2 and implementation option 3), and those implementation options may require extensions to Iu and Gn interfaces and to Serving General Packet Radio Service (GPRS) Support Node (SGSN) functionality.

Figure 6:
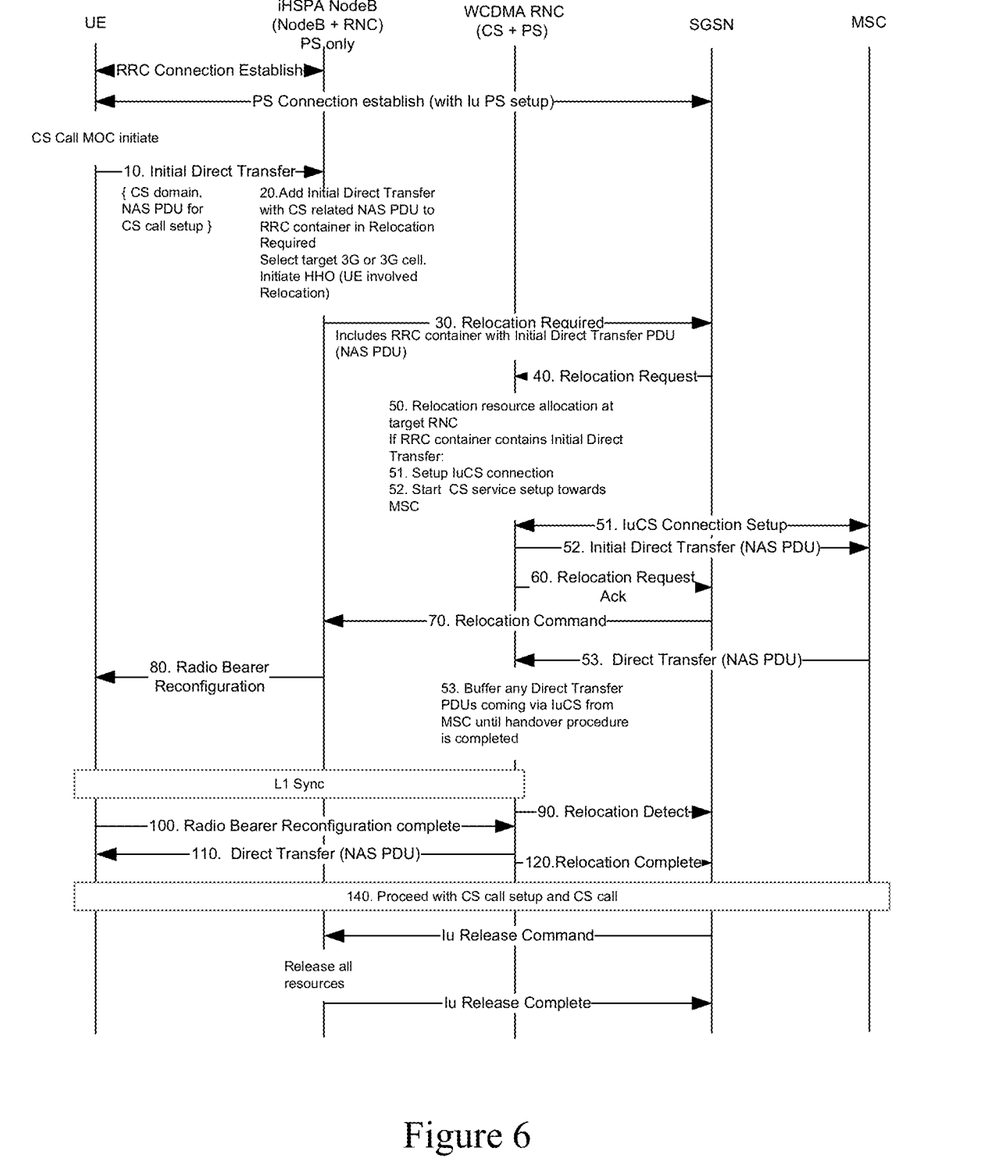
FIG. 6 illustrates an example of a first example (1) of the present invention for fast circuit switched service enabling handovers

The first embodiment, implementation option 1, is illustrated in message diagram form in FIG. 6. When an Initial Direct Transfer with a circuit switched domain indicator is received in a packet switched only RNC (step 10 in FIG. 6), then NAS PDU and the rest of the important parameters from the Initial Direct Transfer needed for circuit switched connection setup can be included as part of the "SRNC RELOCATION INFO" (step 20 in FIG. 6). Message "SRNC RELOCATION INFO" is defined in 3GPP TS 25.331: "Radio Resource Control (RRC); Protocol Specification," chapter 14.12.4.2 and it contains a mechanism for inclusion of additional information elements of this type.

The SRNC RELOCATION INFO can be transferred from a source RNC to a target RNC as an RRC transparent container information element (IE), which can be part of an RANAP SRNC Relocation procedure (steps 30 and 40 in FIG. 6). For this, the SRNC RELOCATION INFO message of the RRC protocol can be extended with necessary IEs that carry all the needed IEs from Initial Direct Transfer PDU requesting circuit switched service. The IEs can include, for example, such elements as NAS PDU, user equipment identity, Location Area Identity (LAI), Service Area Identifier (SAI) and any other needed IE. If there is an ongoing packet switched connection it can also be relocated accordingly.

When the target RNC in the circuit switched and packet switched network receives SRNC RELOCATION INFO from the source RNC as part of an RRC container of RANAP relocation PDUs (step 50 in FIG. 6), and it contains circuit switched service request related IEs (steps 51 and 52 in FIG. 6), the target circuit switched and packet switched RNC can proceed with circuit switched call setup as if it were receiving an Initial Direct Transfer PDU from a Uu interface.

The target circuit switched and packet switched RNC can allocate all needed resources (such as, for example, radio resources) for circuit switched service (step 50) and initiate Iu-circuit switched interface connection setup (step 51 in FIG. 6). After that, the target circuit switched and packet switched RNC can compose an Initial Direct Transfer PDU from IEs that it receives as part of the SRNC RELOCATION INFO container and from information available locally. The target circuit switched and packet switched RNC can then forward this Initial Direct Transfer PDU to a Mobile Switching Center (MSC) (step 52 in FIG. 6).

The target circuit switched and packet switched RNC can also proceed with the rest of the SRNC Relocation procedure (steps 60, 70, 80 in FIG. 6). Note also that relocation messages in steps 60, 70 and 80 can include circuit switched service related radio configuration parameters allocated in step 50. Steps 60, 70 and 80 can be executed in parallel with steps 51 and 52.

If the target packet switched and circuit switched RNC will receive any Direct Transfer PDUs from the Mobile Switching Center (MSC), it can buffer those until the SRNC Relocation is over (step 53 in FIG. 6). When user equipment confirms completion of SRNC relocation (step 90 and 100 in FIG. 6), new source RNC can forward to the user equipment all the buffered (if any) Direct Transfers it received from the Iu-circuit switched interface (step 110 in FIG. 6). If the target packet switched and circuit switched RNC needs to execute any other signaling procedure on the Uu, Iub or IuCS interface related to the circuit switched call setup as a result of internal RNC processing logic or a request from the MSC, it can be delayed until completion of step 100. After SRNC Relocation is completed (step 120 in FIG. 6), circuit switched and packet switched RNC can proceed with the circuit switched call setup and the circuit switched call as normal. If execution of any signaling procedures related to the circuit switched call were delayed, those procedures can be executed as part of step 120.

Implementation option 1 can work fast and efficiently for both user equipments that already have an RRC connection (with or without an active packet switched data connection) and those that do not have any RRC connection to a packet switched only RNC.

FIG. 6 depicts full scenario in which a user equipment already has an RRC connection setup and an active packet switched connection when it makes a circuit switched call setup request. If a user equipment does not have an active RRC connection and, hence, a packet switched connection, then, after the RRC connection is set up, only an Iu-packet switched signaling connection can be set up before step 20 is executed. In this case, the Iu-packet switched signaling connection can be set up by constructing a RANAP Initial UE Message PDU internally in the packet-switched only RNC to trigger Iu-packet switched connection setup. This Initial UE Message can contain either an empty NAS PDU, a Service Request PDU with service type set to "signaling," or, for example, a GMM/SM Status PDU. Other types of NAS PDUs can also be used, depending on the particular implementation of the SGSN.

The implementation can be similar between mobile originating and mobile terminating circuit switched call requests. In the case of a mobile terminating circuit switched call, the signaling depicted in FIG. 6 can happen in response to a paging request.

The error situation handling mechanism of 3GPP SRNC relocation can be extended in a similar manner to handle all needed error situations during circuit switched service enabling handover.

Some possible failure scenarios include, for example:

1. The target RNC is not be able to accept relocation. In this failure scenario, the target RNC can avoid initiating circuit switched setup and can revert to the circuit switched service handover method illustrated in FIG. 3. The Radio Access Network (RAN) node can give priority to the circuit switched call establishment and can avoid canceling relocation if it is unable to accept RABs. In such a case, the RAN node can drop the RABs, as they can be reactivated later by the user equipment when needed.

2. The user equipment fails to act on the handover command and instead of switching to new configuration in new cell, falls back to the old configuration. In this failure scenario, relocation can be canceled from the source packet switched-only RNC, and the user equipment can be forced to a new cell reselection as in current methods for circuit switched service enabling handovers, as shown, for example, in FIG. 3.

Implementation option 1 can provide various advantages. For example, implementation option 1 can produce minimum impact on the RNC interfaces, as there is no impact whatsoever to Uu and Iu (both packet switched and circuit switched) interface signaling. Furthermore, the proposed change to the SRNC RELOCATION INFO container can be transparent to the Iu interface and the SGSN functionality as well as to the Gn interface. Also, the structure of the RRC messages defined in 3GPP allows the addition of extra IEs in a backward-compatible manner.

Implementation options 2 and 3 can include the same extensions to existing RRC protocol messages as implementation option 1 as well as changes to Iu interface signaling in respect to initiation of relocation. These additional changes can provide further optimization for delay for circuit switched service enabling handover for certain implementations of an SGSN.

In implementation option 2, Radio Access Network Application Part (RANAP) signaling can be extended so that the RNC could require relocation with service request (a new type) and can add proposed necessary information to that message. In implementation option 3, RANAP signaling can be extended so that RNC could require relocation with connectionless messages (a new message or, for example, an "information transfer" message may be used for this purpose).

Figure 7:
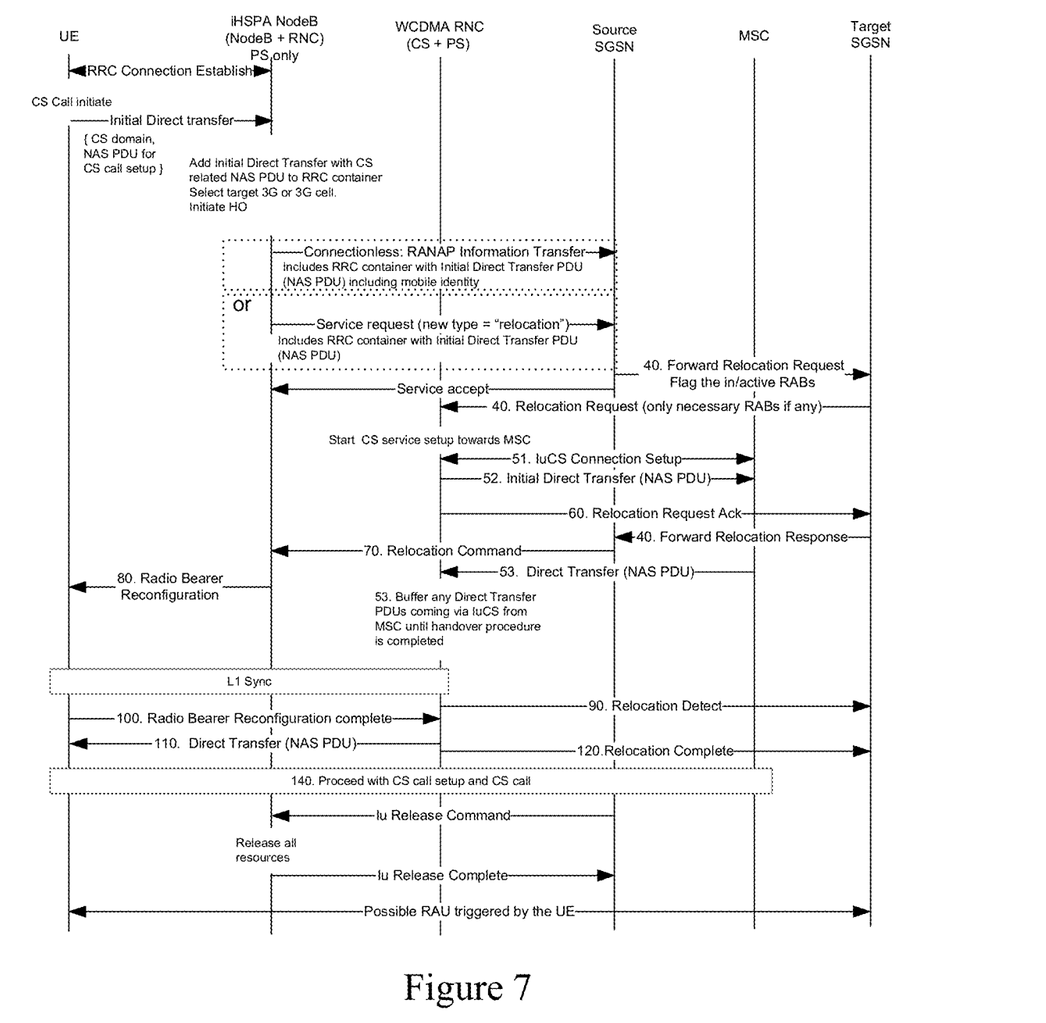
FIG. 7 illustrates a pair of further examples (2 and 3) for fast circuit switched service enabling handovers.

Both implementation options 2 and 3 are illustrated in FIG. 7. In both of implementation options 2 and 3, the time needed for Iu connection establishment in certain SGSN implementations can be further reduced as compared to implementation option 1. Additionally, the SGSN could send a relocation request immediately after (or instead of) service acceptance. The connectionless option, however, could not continue as traditional relocation unless the Iu connection is established right after relocation request is sent out.

One further option (implementation option 4) to overcome limitations of some SGSN implementations is to change the RANAP specification to allow Iu-packet switched (IuPS) signaling connection establishment to be triggered by a Relocation Required message and SRNS Relocation processing in SGSN to be allowed for UEs for which no context(s) exists in the SGSN for cases in which SRNS Relocation is used only for circuit switched call redirection. Such cases could be marked in Relocation Required RANAP PDU with a new value for relocation cause, such as, for example, "circuit-switched call redirection."

When relocation is inter-SGSN and Radio Access Bearers (RABs) are not established in the source SGSN, the target SGSN can anyway establish RABs for all Packet Data Protocol (PDP) contexts. Thus, there can be no need for RABs when the user equipment is going to have circuit switched call, and establishing them can be considered unnecessary.

Adding a mark to a forward relocation request message that RAB establishment for defined PDP contexts is not needed in this case in the target SGSN can help to avoid unnecessary establishment of RABs. Thus, the existing RABs can be created, but new ones can be avoided. This is illustrated, for example, in FIG. 7 as example. This avoidance of RAB establishment may be useful to each of implementation options 1, 2, 3, and 4.

After initial direct transfer, the user equipment may continue service establishment as it normally would, by sending a service request (or possibly a location update). This does not have to affect relocation, which can continue normally. The user equipment can be ordered to move to a target RAN in the relocation command phase and the user equipment can continue the service establishment in the target RAN.

Preservation and transfer of circuit switched call requests from a packet switched-only radio access network to a circuit switched and packet switched radio access network can be used for circuit switched service enabling handovers from packet switched-only Third Generation (3G) networks to circuit switched and circuit switched and packet switched Second Generation (2G), GRPS, and GERAN networks although the details of the needed signaling exchange may differ. For example, in a packet switched only to circuit switched handover, the SGSN may connect to MSC/MSC Server directly and pretend to be a source MSC, thereby mimicking an inter MSC handover.

The similar way of extending the RRC transparent container as applied in implementation option 1, can also be used for load balancing between the I-HSPA NodeBs (NodeB and RNCs) and circuit switched and packet switched RNC as well as serving as a mechanism to avoid handover ping-pong effects between two I-HSPA NodeBs or between an I-HSPA NodeB and a circuit switched and packet switched RNC.

Based on load indication, as part of RRC transparent container, the target RNC can compare a load condition between source and target systems and the target RNC may accept or reject relocation accordingly.

In certain embodiments of the present invention, therefore, point to multi-point Iur and Iu-circuit switched interfaces can be avoided between legacy RNC or MSC and high number of I-HSPA NodeBs. Furthermore, a fast and reliable circuit switched service enabling handovers by extending functionality of packet switched and circuit switched RNC can be provided. Likewise, certain embodiments of the present invention can be compatible with user equipments from Release 99 and later onward, including Release 5 terminals.

Implementations 2, 3, and 4 can include changes to the SRNC Relocation procedure and the Iu interface, as well as SGSN functionality in relation to SRNC Relocation. Implementations 2, 3, and 4, therefore, are not backward-compatible with older 3GPP specification releases (at least Release 99,4,5,6). Furthermore, the connectionless signaling involved does not guarantee delivery of message. This may not be desirable in the case of time sensitive handovers.

Figure 8:
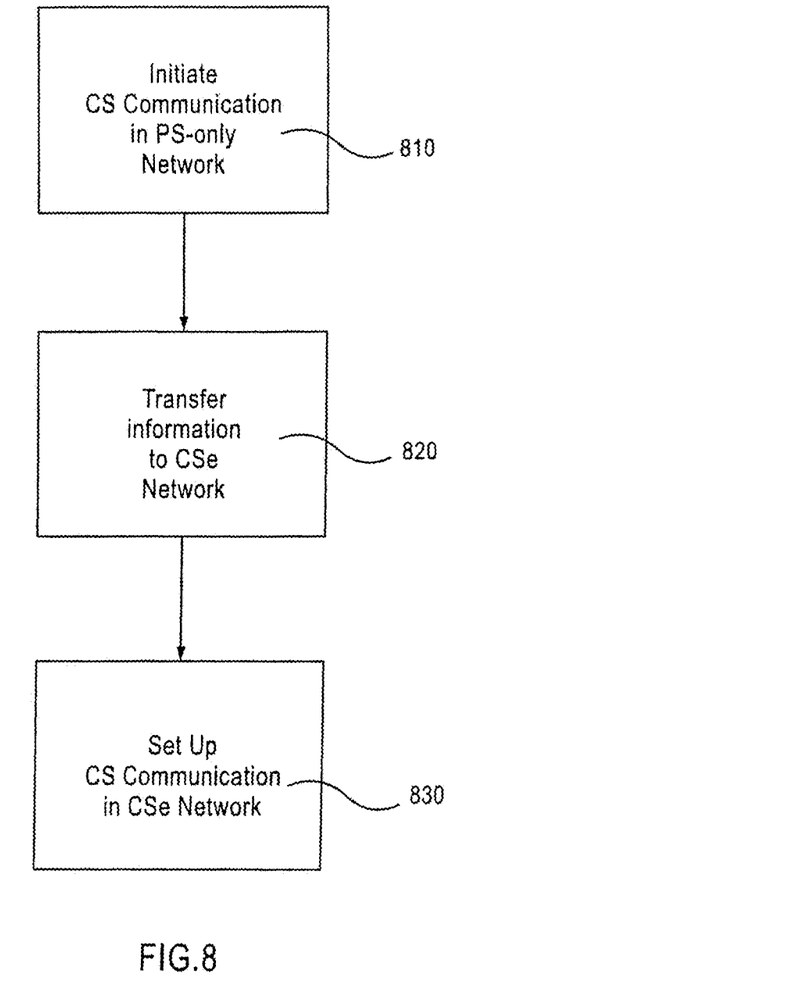
FIG. 8 illustrates an embodiment of a method according to the present invention.

FIG. 8 illustrates a method according to an embodiment of the present invention. The method includes initiating 810 a circuit switched connection regarding a user equipment that is associated with a packet switched only network. The method also includes transferring 820 information regarding the initiating the circuit switched connection from the packet switched only network to a circuit switched enabled network. The method further includes setting up 830 the circuit switched connection between the user equipment and the circuit switched enabled network.

In the method shown in FIG. 8, the initiating the circuit switched connection can include the circuit switched connection being requested to the user equipment. Alternatively, the initiating the circuit switched connection can include the circuit switched connection being requested from the user equipment.

When the circuit switched connection is requested from the user equipment, the requesting the circuit switched connection from the user equipment can include sending a circuit switched service request. The request can be sent to a radio network controller of the packet switched only network. In one embodiment, the request can be sent as an initial direct transfer protocol data unit.

The method can further include (not shown) identifying from the initial direct transfer protocol data unit that circuit switched service is requested. In certain embodiments, the identifying can be performed by the radio network controller.

The user equipment can be associated with the packet switched only network by a radio resource control connection. This radio resource control connection can be set up before the initiation of the circuit switched service, or as part of the initiation of the circuit switched service.

When the circuit switched connection is requested to the user equipment, the initiating can include sending a paging request for the user equipment.

The transferring information can include both transferring a circuit switched service request, and transferring control of the user equipment. The request and control can be transferred to a radio network controller of the circuit switched enabled network. The circuit switched enabled network can be a circuit switched only network or a circuit switched and packet switched network.

The setting up can include sending a circuit switched service request from a radio network controller of the circuit switched enabled network to a core network node of the circuit switched enabled network. The setting up can also include taking the user equipment under control of a radio network controller of the circuit switch enabled network. The setting up can further include commanding the user equipment to move to a cell under control of a radio network controller of the circuit switched enabled network. The setting up can additionally include buffering any circuit switched service setup messages until the user equipment has moved to a cell under control of a radio network controller of the circuit switched enabled network. The setting up can additionally include delaying execution of any circuit switched service setup related signaling procedure on the Uu, Iub and IuCS interfaces until the user equipment has moved to a cell under control of a radio network controller of the circuit switched enabled network.

The method can additionally include forwarding buffered circuit switched service setup messages to the user equipment once the user equipment has moved to a cell under control of a radio network controller of the circuit switched enabled network.

The method of FIG. 8 can be implemented in a system. The system can include an initiation unit configured to initiate a circuit switched connection regarding a user equipment that is associated with a packet switched only network. The system can also include a transfer unit configured to transfer information regarding initiation of the circuit switched connection from the packet switched only network to a circuit switched enabled network. The system can further include a setup unit configured to set up the circuit switched connection between the user equipment and the circuit switched enabled network.

Figure 9:
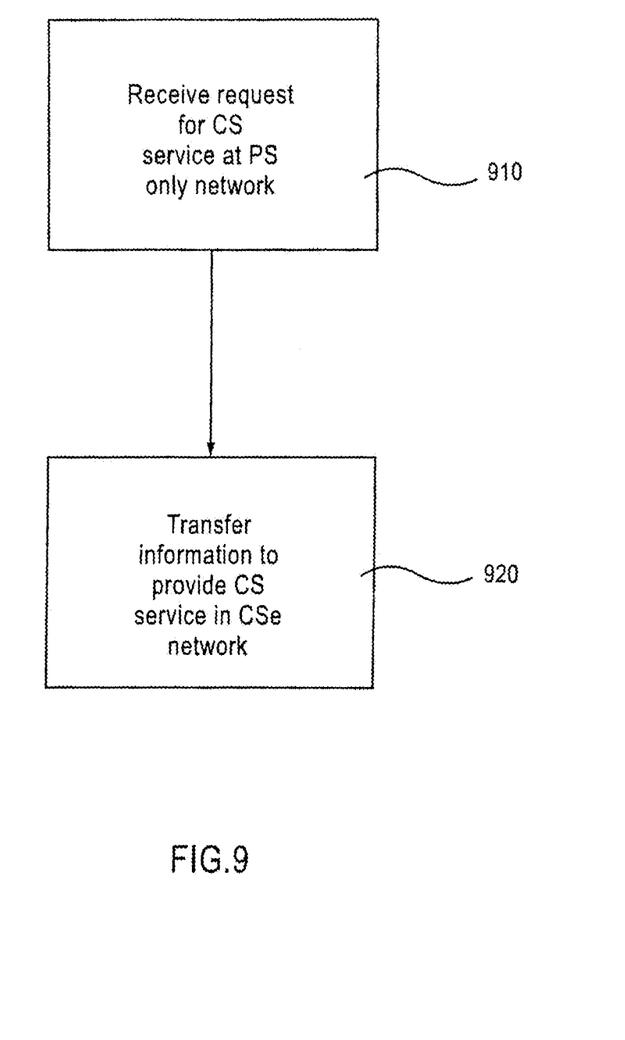
FIG. 9 illustrates an embodiment of another method according to the present invention.

FIG. 9 illustrates another method according an embodiment of the present invention. The method of FIG. 9 includes receiving 910 a request to initiate a circuit switched connection regarding a user equipment that is associated with a packet switched only network. The method also includes transferring 920 information regarding the initiating the circuit switched connection from the packet switched only network to a circuit switched enabled network. The transferring the information is configured to result in the setup of the circuit switched connection between the user equipment and the circuit switched enabled network.

The receiving the request can include receiving the request from the user equipment, or, alternatively, can include receiving a paging. The request can be received at a radio network controller of the packet switched only network. The request can be in the form of an initial direct transfer protocol data unit.

The method can additionally include (not shown) identifying from the initial direct transfer protocol data unit that circuit switched service is requested. This identifying can be performed by the radio network controller.

The transferring information can include transferring a circuit switched service request and control of the user equipment. The information and control can be transferred to a radio network controller of the circuit switched enabled network. The circuit switch enabled network can be a circuit switched only network or a circuit switched and packet switched network.

Figure 10:
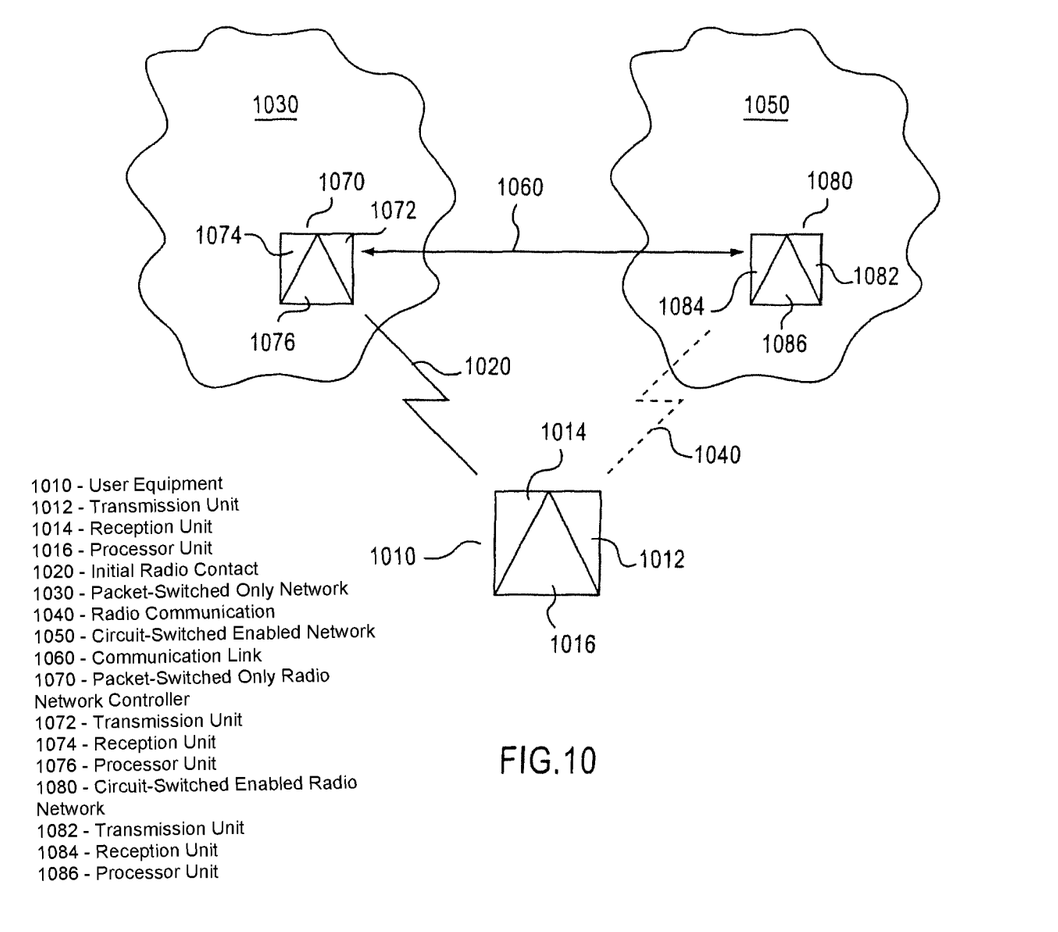
FIG. 10 illustrates a system according to an embodiment of the present invention.

FIG. 10 illustrates a system according to an embodiment of the present invention. As shown in FIG. 10, a user equipment (UE) 1010 can be in initial radio contact 1020 with a packet-switched only network 1030. The UE 1010 can request a circuit-switched connection from the packet-switched only network 1030 (or another entity can request a circuit-switched connection with the UE 1010). In response to the request, the packet-switched only network 1030 can redirect the UE 1010 to a radio communication 1040 with a circuit-switched enabled network 1050. To accomplish this redirection, the packet-switched only network 1030 can communicate with the circuit-switched enabled network 1050 over a communication link 1060, which may be a wireline or wireless communication link. The communication over the communication link 1060 can include transferring information in the request as well as control of the UE 1010.

The packet-switched only network 1030 can include a packet-switched only radio network controller 1070. The packet-switched only radio network controller 1070 can include a transmission unit 1072, a reception unit 1074, and a processor unit 1076. The processor unit 1076 can be configured to identify that the user equipment 1010 should be transferred to a circuit switched enabled network.

In the packet-switched only radio network controller 1070, the reception unit 1074 and processor unit 1076 can be configured to function as a reception unit and to receive the request to initiate the circuit switched connection 1040 regarding the user equipment 1010 that is associated with the packet switched only network 1030. Likewise, the transmission unit 1072 and the processor unit 1076 can be configured to function as a transfer unit and to transfer information regarding the initiating the circuit switched connection 1040 from the packet switched only network 1030 to a circuit switched enabled network 1050. The transfer of information can be configured to result in the setup of the circuit switched connection 1040 between the user equipment 1010 and the circuit switched enabled network 1050.

The packet-switched only radio network controller 1070 can be implemented in hardware, software, or a combination thereof. The packet-switched only radio network controller 1070 can, for example, be implemented as a computer program product embodied on a computer readable medium encoding various instructions. The packet-switched only radio network controller 1070 can, for example, be implemented a general purpose computer or an application specific integrated circuit. The packet-switched only radio network controller 1070 can be provided with suitable memory and communication interfaces for performing data processing, and for performing communication tasks.

The circuit-switched enabled network 1050 can include a circuit-switched enabled radio network controller 1080. The circuit-switched enabled radio network controller 1080 can include a transmission unit 1082, a reception unit 1084, and a processor unit 1086. The processor unit 1086 can be configured to process information provided and to take control of the user equipment 1010.

The circuit-switched enabled radio network controller 1080 can be implemented in hardware, software, or a combination thereof. The circuit-switched enabled radio network controller 1080 can, for example, be implemented as a computer program product embodied on a computer readable medium encoding various instructions. The circuit-switched enabled radio network controller 1080 can, for example, be implemented a general purpose computer or an application specific integrated circuit. The circuit-switched enabled radio network controller 1080 can be provided with suitable memory and communication interfaces for performing data processing, and for performing communication tasks.

The UE 1010 can include a transmission unit 1012, a reception unit 1014, and a processor unit 1016. The processor unit 1016 can be configured to generate a suitable request for circuit switched services and to perform a relocation function for the UE 1010. The UE 1010 can be implemented in hardware, software, or a combination thereof. The UE 1010 can, for example, be implemented as a computer program product embodied on a computer readable medium encoding various instructions.

The UE 1010 can, for example, be implemented a general purpose computer or an application specific integrated circuit. The UE 1010 can be provided with suitable memory and communication interfaces for performing data processing, and for performing communication tasks. More particularly, the UE 1010 can be implemented on or as a mobile terminal, a mobile communication unit, a cellular telephone, a personal digital assistant, or any portable electronic device that is communication capable. UE 1010 can be configured to be capable of communicating with both packet-switched only and circuit-switched enabled networks.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A method, comprising:
   initiating, by a network node of a packet switched network responsive to receiving a request for a circuit switched connection, establishment of the circuit switched connection, wherein the circuit switched connection regards a user equipment that is associated with the packet switched network, wherein the request comprises a plurality of parameters relating to the establishment of the circuit switched connection, wherein at least one of the plurality of parameters are associated with at least one radio resource control transparent container information element, and wherein the at least one radio resource control transparent container information element comprises one or more of at least one non access stratum protocol data unit, at least one location area identity, and at least one service area identifier; and
   transferring, by the network node of the packet switched network, information regarding the initiating of the establishment of the circuit switched connection from the packet switched network to a circuit switched enabled network comprising at least one radio resource control transparent container information element,
   wherein the user equipment already has a radio resource control connection setup and an active packet switched connection when the request for the circuit switched connection is made.

2. The method of claim 1, wherein the initiating the circuit switched connection comprises the circuit switched connection being requested from the user equipment.

3. The method of claim 1, wherein the request comprises an initial direct transfer protocol data unit with a non-access stratum message.

4. An apparatus, comprising:
   at least one processor; and
   at least one memory including computer program code,
   wherein the at least one memory and the computer program code are configured to, with the at least one processor, cause the apparatus at least to:
   initiate, responsive to receiving a request for a circuit switched connection, establishment of the circuit switched connection, wherein the circuit switched connection regards a user equipment that is associated with the packet switched network, wherein the request comprises a plurality of parameters relating to the establishment of the circuit switched connection, wherein at least one of the plurality of parameters are associated with at least one radio resource control transparent container information element, and wherein the at least one radio resource control transparent container information element comprises one or more of at least one non access stratum protocol data unit, at least one location area identity, and at least one service area identifier; and transfer information regarding the initiating of the establishment of the circuit switched connection from the packet switched network to a circuit switched enabled network comprising at least one radio resource control transparent container information element, wherein the user equipment already has a radio resource control connection setup and an active packet switched connection when the request for the circuit switched connection is made.

5. The apparatus of claim 4, wherein the initiating the circuit switched connection comprises the circuit switched connection being requested from the user equipment.

6. The apparatus of claim 4, wherein the request comprises an initial direct transfer protocol data unit with a non-access stratum message.

7. A computer program, embodied on a non-transitory computer readable medium, the computer program, when executed by a processor, causes the processor to:

initiate, responsive to receiving a request for a circuit switched connection, establishment of the circuit switched connection, wherein the circuit switched connection regards a user equipment that is associated with the packet switched network, wherein the request comprises a plurality of parameters relating to the establishment of the circuit switched connection, wherein at least one of the plurality of parameters are associated with at least one radio resource control transparent container information element, and wherein the at least one radio resource control transparent container information element comprises one or more of at least one non access stratum protocol data unit, at least one location area identity, and at least one service area identifier; and transfer information regarding the initiating of the establishment of the circuit switched connection from the packet switched network to a circuit switched enabled network comprising at least one radio resource control transparent container information element comprising at least one radio resource control transparent container information element, wherein the user equipment already has a radio resource control connection setup and an active packet switched connection when the request for the circuit switched connection is made.

8. The computer program of claim 7, wherein the initiating the circuit switched connection comprises the circuit switched connection being requested from the user equipment.

9. The computer program of claim 7, wherein the request comprises an initial direct transfer protocol data unit with a non-access stratum message.

\* \* \* \* \*